UNITED STATES PATENT OFFICE.

HENRY STAIER, OF NEW YORK, N. Y.

PROCESS OF PRODUCING MATCH-COMPOSITION INGREDIENTS.

1,011,650.

No Drawing.

Specification of Letters Patent. Patented Dec. 12, 1911.

Application filed November 16, 1910. Serial No. 592,598.

*To all whom it may concern:*

Be it known that I, HENRY STAIER, a subject of the Emperor of Germany, having announced my intention of becoming a citizen of the United States, and a resident of New York, county and State of New York, have invented certain new and useful Improvements in Processes or Methods of Producing Match-Composition Ingredients, of which the following is a specification.

The principal inflammable ingredient of ordinary match compositions is yellow phosphorus, but there is a great objection to its employment in that it is highly poisonous to the workmen who handle it and who are subjected to its fumes. Substitutes therefor have been tried, but the results generally have been unsatisfactory, in that the resulting compounds have either been unreliable, unstable, have required a high temperature to ignite them, have been explosive, or have otherwise been unsatisfactory.

It is the object of my present invention to produce a non-poisonous compound such as will be stable, reliable, non-explosive, and subject to ignition at a low temperature.

In carrying out my invention I provide as a substitute for the yellow phosphorus a compound produced by combining amorphous phosphorus, chlorid of sulfur, and a metallic sulfid. The precise proportions thereof employed is not of the essence of my invention, but as an example I may say that I have obtained good results from a compound produced by combining 10 parts (by weight) of the amorphous phosphorus, 8 parts (by weight) of the chlorid of sulfur, and 2 parts (by weight) of the metallic sulfid. At the time the materials are mixed the chlorid of sulfur should be at a temperature of about 150 degrees Fahrenheit. The three materials are thoroughly mixed together, the phosphorus and the metallic sulfid first, and the heated chlorid of sulfur afterward added thereto, and as the chlorid of sulfur at the temperature mentioned comes into contact with the phosphorus and the metallic sulfid, there is a violent reaction; the mixture bursts into flame and the reaction continues for some minutes. Thereafter I thoroughly wash the compound, then draw off the surplus water, and dry the residue. The product is a powder of various colors, depending upon the particular metallic sulfid employed. This material may be iron, zinc, copper, antimony, or other sulfids. If for instance copper sulfid be employed the result will be a powder of a greenish color, while if zinc sulfid be employed the resulting powder will be of a grayish color. I then take the product obtained as above, and mix it in the proper proportion with one or more inert friction and binding elements such as powdered glass, whiting, and glue, or other ingredients such as are commonly employed in match head compounds, the said product taking the place of the yellow phosphorus commonly employed. The final compound may be applied to splints or stems in the usual or any desired manner.

The manufacture of this composition may be carried on with impunity as neither the ingredients themselves nor their fumes are poisonous. The resultant composition is stable and reliable, non-explosive, and will ignite under friction at a low temperature. Moreover the composition is not injuriously affected by moisture, but on the contrary when again dried will ignite as readily as before.

What I claim is:

1. The herein described process of producing a substitute for yellow phosphorus in the manufacture of match compositions which comprises heating chlorid of sulfur to a temperature of about 150 degrees Fahrenheit, and mixing the same with amorphous phosphorus and a metallic sulfid.

2. The herein described process of producing a substitute for yellow phosphorus in the manufacture of match compositions which comprises heating chlorid of sulfur to a temperature of about 150 degrees Fahrenheit, and mixing the same with amorphous phosphorus and a metallic sulfid, in permitting the resultant reaction to continue until subsidence, in then washing the mixture, and then removing the surplus water and drying the product.

3. The herein described process of producing a substitute for yellow phosphorus in the manufacture of match compositions which comprises heating chlorid of sulfur to a temperature of about 150 degrees Fahrenheit, and mixing the same with amorphous phosphorus and a metallic sulfid, in the proportion by weight of about ten parts of the amorphous phosphorus, to about eight parts of the chlorid of sulfur, and 2 parts of the metallic sulfid.

4. The herein described process of producing a substitute for yellow phosphorus in the manufacture of match compositions which comprises heating chlorid of sulfur to a temperature of about 150 degrees Fahrenheit, and mixing the same with amorphous phosphorus and a metallic sulfid in the proportion by weight of about ten parts of the amorphous phosphorus, to about eight parts of the chlorid of sulfur and two parts of metallic sulfid, in permitting the resultant reaction to continue until subsidence, in then washing the mixture, and then removing the surplus water and drying the product.

HENRY STAIER.

Witnesses:
D. HOWARD HAYWOOD,
LYMAN S. ANDREWS, Jr.